(12) United States Patent
Daiss et al.

(10) Patent No.: US 8,822,621 B2
(45) Date of Patent: Sep. 2, 2014

(54) METHOD FOR PRODUCING (HYDROXYMETHYL)POLYSILOXANES

(75) Inventors: Jürgen Oliver Daiss, München (DE); Jens Cremer, München (DE); Elke Fritz-Langhals, Ottobrunn (DE); Steffen Jungermann, München (DE)

(73) Assignee: Wacker Chemie AG, Munich (DE)

( * ) Notice: Subject to any disclaimer, the term of this patent is extended or adjusted under 35 U.S.C. 154(b) by 236 days.

(21) Appl. No.: 13/505,215

(22) PCT Filed: Oct. 14, 2010

(86) PCT No.: PCT/EP2010/065451
§ 371 (c)(1),
(2), (4) Date: Apr. 30, 2012

(87) PCT Pub. No.: WO2011/051108
PCT Pub. Date: May 5, 2011

(65) Prior Publication Data
US 2012/0220793 A1    Aug. 30, 2012

(30) Foreign Application Priority Data

Oct. 30, 2009 (DE) .......................... 10 2009 046 254

(51) Int. Cl.
 *C08G 77/16* (2006.01)

(52) U.S. Cl.
 USPC ............... 528/40; 528/10; 528/20; 556/467; 556/468; 556/478

(58) Field of Classification Search
 USPC ............... 556/467, 468, 478; 528/10, 20, 40
 See application file for complete search history.

(56) References Cited

U.S. PATENT DOCUMENTS

| | | | |
|---|---|---|---|
| 2,833,802 A * | 5/1958 | Merker | ............ 556/440 |
| 3,324,161 A | 6/1967 | Simmler | |
| 3,444,228 A | 5/1969 | Simmler | |
| 3,446,830 A | 5/1969 | Hans et al. | |
| 3,481,963 A | 12/1969 | Simmler et al. | |
| 2004/0073031 A1 * | 4/2004 | Schfer et al. | ............ 546/14 |
| 2009/0149595 A1 | 6/2009 | Minge et al. | |

FOREIGN PATENT DOCUMENTS

| | | |
|---|---|---|
| DE | 879 839 A | 6/1953 |
| DE | 1 199 772 B | 9/1965 |
| DE | 1 213 406 B | 3/1966 |
| DE | 1 227 456 B | 10/1966 |
| DE | 1 233 395 B | 2/1967 |
| DE | 1 236 505 B | 3/1967 |
| DE | 1 251 320 B | 10/1967 |
| DE | 101 09 842 A1 | 10/2002 |
| DE | 10 2004 029 259 A1 | 1/2006 |
| DE | 10 2005 045 334 A1 | 3/2007 |
| EP | 0 768 347 B1 | 4/1997 |
| EP | 0 629 648 B1 | 7/1998 |
| GB | 1 121 265 A | 7/1968 |
| SU | 1512982 A1 | 10/1989 |

OTHER PUBLICATIONS

Sudarsanan Varaprath, Joan M. McMahon, and Kathleen P. Plotzke, Metabolites of Hexamethyldisiloxane and Decamethylcyclopentasiloxane in Fischer 344 Rat Urine-A Comparison of a Linear and a Cyclic Siloxane, The American Society for Pharmacology and Experimental Therapeutics, 2003, 31(2), 206-214.
Dalet, Pierre, International Search Report dated Dec. 23, 2010, for International Application No. PCT/EP2010/065451.

\* cited by examiner

*Primary Examiner* — Sudhakar Katakam
*Assistant Examiner* — Pancham Bakshi
(74) *Attorney, Agent, or Firm* — RatnerPrestia

(57) ABSTRACT

A method for producing (hydroxymethyl)polysiloxanes of the general formula I $$(SiO_{4/2})_k(R^1SiO_{3/2})_m(R^1{}_2SiO_{2/2})_p(R^1{}_3SiO_{1/2})_q[O_{1/2}-(SiR^2{}_2-X-Y-)_aSiR^2{}_2-CH_2-OH]_s[O_{1/2}H]_t \quad \text{formula I},$$

includes reacting silanol-containing organosiloxanes of the general formula II $$(SiO_{4/2})_k(R^1SiO_{3/2})_m(R^1{}_2SiO_{2/2})_p(R^1{}_3SiO_{1/2})_q[O_{1/2}H]_r \quad \text{formula II}$$

with cyclic or acyclic compounds that include at least one unit of the general formula III $$Z-[O-CH_2-SiR^2{}_2]_n-Y \quad \text{formula III}$$

9 Claims, No Drawings

METHOD FOR PRODUCING (HYDROXYMETHYL)POLYSILOXANES

CROSS REFERENCE TO RELATED APPLICATIONS

This application is the national phase filing of international patent application No. PCT/EP2010/065451, filed 14 Oct. 2010, and claims priority of German patent application number 10 2009 046 254.6, filed 30 Oct. 2009, the entireties of which applications are incorporated herein by reference.

FIELD OF THE INVENTION

The present invention relates to a method for producing (hydroxymethyl)polysiloxanes and (hydroxymethyl)-polysiloxane resins.

BACKGROUND OF THE INVENTION (Hydroxyalkyl)polysiloxanes and (hydroxyalkyl)-polysiloxane resins incorporate as structural element units of the formula

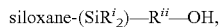

siloxane-(SiR$^i_2$)—R$^{ii}$—OH, where R$^i$ is alkyl or aryl, generally methyl, and R$^{ii}$ is a hydrocarbon moiety which may contain or be substituted with heteroatoms and which is attached to the silicon atom in the (SiR$^i_2$) group via a carbon atom. The presence of R$^{ii}$ between the silicon atom and the depicted OH group has the effect that the bond attaching the OH group to the siloxane scaffold is hydrolysis stable. When the OH group is reacted with other compounds, the bond attaching the resulting products to the siloxane scaffold will likewise be hydrolysis stable.

The R$^{ii}$ group is in effect a structure-conferring factor which co-determines not only the properties of the (hydroxyalkyl)polysiloxane, or respectively (hydroxyalkyl)polysiloxane resin, but also the properties of descendant products obtainable using the (hydroxyalkyl)polysiloxane or respectively the (hydroxyalkyl)polysiloxane resin. It is especially the mobility of R$^{ii}$ as well as the organic character of R$^{ii}$ which influences these properties. When, for example, the mobility of R$^{ii}$ and/or the organic character of a (hydroxyalkyl)polysiloxane or respectively of a (hydroxyalkyl)polysiloxane resin or descendant products thereof are to be kept to a minimum, very small R$^{ii}$ moieties are ideal, and the choice of R$^{ii}$ as CH$_2$ is especially advantageous. A further advantage of this choice for R$^{ii}$ is that small structural units mean lower reaction volumes for the same amount of substance of R$^{ii}$-attached OH groups and hence enhanced space-time yields both in the production of (hydroxyalkyl)polysiloxanes or respectively of (hydroxyalkyl)polysiloxane resins and in the production of descendant products thereof.

(Hydroxyalkyl)polysiloxanes and (hydroxyalkyl)-polysiloxane resins where R$^{ii}$ is CH$_2$ are hereinafter referred to as (hydroxymethyl)polysiloxanes and (hydroxymethyl)polysiloxane resins, respectively.

Methods for producing (hydroxyalkyl)polysiloxanes and (hydroxyalkyl)polysiloxane resins are described in the literature.

The references EP 629 648, EP 768 347, DE 101 09 842, DE 10 2004 029 259 and DE 10 2005 045 334 describe methods wherein polysiloxanes/polysiloxane resins or fillers that bear Si—OH groups are reacted with cyclic or linear compounds of the structure *[SiR$^i_2$—R$^{ii}$—O—]$_\phi$*=end groups or ring closure; $\phi \geq 1$). None of these references describes a method wherein R$^{ii}$ is CH$_2$.

Methods for producing (hydroxymethyl)polysiloxanes and (hydroxymethyl)polysiloxane resins (R$^{ii}$ is CH$_2$) are likewise described in the literature.

The references DE 1 213 406, DE 1 236 505, DE 1 251 320, DE 879 839 and DE 1 233 395 describe the production of (hydroxymethyl)polysiloxanes and of (hydroxymethyl)polysiloxane resins by reaction of (halomethyl)polysiloxanes and of (halomethyl)polysiloxane resins, respectively, with metal hydroxides (DE 1 213 406) or with (i) metal carboxylates and (ii) transesterification of the resultant (acyloxymethyl)polysiloxanes and (acyloxymethyl)polysiloxane resins with alcohols (DE 879 839; cf. production of (acyloxymethyl)-polysiloxanes and of (acyloxymethyl)polysiloxane resins by reaction of (halomethyl)polysiloxanes and of (halomethyl)polysiloxane resins, respectively, with ammonium carboxylates: DE 1 199 772, U.S. Pat. No. 2,833,802). However, the siloxane scaffold will generally undergo rearrangements under the conditions described.

DE 1 236 505 and DE 1 251 320 describe the production of (hydroxymethyl)polysiloxanes and of (hydroxymethyl)-polysiloxane resins respectively by transesterification of (acyloxymethyl)polysiloxanes and of (acyloxymethyl)-polysiloxane resins respectively with alcohols under catalysis by arylsulfonic acids. DE 1 236 505 describes inter alia a method wherein linear poly(dimethylsiloxane) ($\alpha,\omega$-OH-terminated) is reacted with an (acyloxymethyl)dimethylethoxysilane, and the Si-(acyloxymethyl) groups are transesterified with methanol to Si-(hydroxymethyl) groups (Si—CH$_2$—OH) (reaction "f)" in DE 1 236 505). However, drastic conditions (toluenesulfonic acid and heating) have to be used to transesterify the Si-(acyloxymethyl) groups. Yet under such conditions the siloxane scaffold will generally become rearranged.

DE 1 233 395 describes the production of (hydroxymethyl)polysiloxanes and of (hydroxymethyl)-polysiloxane resins by reaction of (acyloxymethyl)polysiloxanes and of (acyloxymethyl)-polysiloxane resins respectively with alkali metal boronates and hydrolysis of the resultant primary product. However, alkali metal boronates are costly reagents and moreover can attack and change the siloxane scaffold.

DE 1 227 456, DE 879 839 and SU 1 512 982 describe the production of (hydroxymethyl)polysiloxanes and of (hydroxymethyl)polysiloxane resins by equilibration of, for example, 1,3-bis(hydroxymethyl)-1,1,3,3-tetramethyldisiloxane with cyclic or acyclic organopolysiloxanes. However, for such an equilibration reaction to take place it is necessary for the siloxane formation of the 1,3-bis(hydroxymethyl)-1, 1,3,3-tetramethyldisiloxane to cleave. Yet the conditions under which this disiloxane bond is cleaved also cause siloxane bonds to rearrange/cleave in the organopolysiloxane which is to be converted.

What is common to the methods described for producing (hydroxymethyl)polysiloxanes and (hydroxymethyl)-polysiloxane resins is that the reaction conditions tend to cause rearrangements of the siloxane scaffold, and so the methods do not lead to defined products. Furthermore, the resulting ≡SiCH$_2$OH groups are frequently not released quantitatively from the corresponding precursor compounds (e.g., ≡SiCH$_2$—Oacyl or ≡SiCH$_2$-halogen), and/or the resulting ≡SiCH$_2$OH groups react further under the reaction conditions (e.g., with HCl to form ≡SiCH$_2$Cl groups, with sulfuric acid to form ≡SiCH$_2$OCH$_2$Si≡ groups or with hydroxides to cleave the Si—C bond in SiCH$_2$OH groups to Si—OH groups), and so the product does not have the theoretically expected number/concentration of ≡SiCH$_2$OH groups. Furthermore, reagent residues and/or catalyst residues in the product frequently lead to rearrangement, cleavage, condensation or equilibration of the siloxane scaffold, and so the product properties of (hydroxymethyl)polysiloxanes and of (hydroxymethyl)polysiloxane resins produced by literature methods frequently change during storage. All these inventions hinder or prevent the further conversion of the (hydroxymethyl)polysiloxanes or (hydroxymethyl)polysiloxane resins obtained in the prior art into defined descendant products, it holds particularly for descendant reactions at the $SiCH_2OH$ group.

SUMMARY OF THE INVENTION

The problem addressed by the invention is therefore that of improving the prior art, providing a method for producing (hydroxymethyl)polysiloxanes and (hydroxymethyl)polysiloxane resins which leads to defined products, preferably in high purity and preferably with high product stability.

DETAILED DESCRIPTION OF THE INVENTION

The invention provides a method for producing (hydroxymethyl)polysiloxanes and (hydroxymethyl)-polysiloxane resins of the general formula I

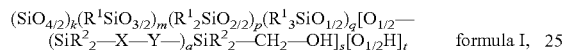   formula I, which comprises reacting silanol-containing organosiloxanes/organosiloxane resins of the general formula II

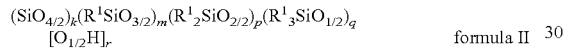   formula II with cyclic or acyclic compounds which include at least one unit of the general formula III

   formula III where
- $R^1$ denotes a hydrogen atom or a cyclic or acyclic, linear or branched, aromatic or aliphatic or olefinic, saturated or unsaturated $C_1$-$C_{20}$ hydrocarbon, $C_1$-$C_{20}$ hydrocarbonoxy or $C_4$-$C_{40}$ polyether moiety optionally substituted with $Q^1$ and optionally interrupted by one or more heteroatom-containing groups $Q^2$,
- $R^2$ denotes a cyclic or acyclic, linear or branched aromatic or aliphatic or olefinic, saturated or unsaturated $C_1$-$C_{20}$ hydrocarbon, $C_1$-$C_{20}$ hydrocarbonoxy, $C_4$-$C_{40}$ polyether or $Si_1$-$Si_{20}$ siloxanyl moiety optionally substituted with $Q^1$, optionally interrupted by one or more heteroatom-containing groups $Q^2$ or containing one or more heteroatom-containing groups $Q^2$,
- $Q^1$ denotes a heteroatom-containing monovalent moiety,
- $Q^2$ denotes a heteroatom-containing divalent moiety or a heteroatom-containing trivalent moiety,
- Z represents hydrogen, a group X—$SiR^2_2$—, or combines with Y to represent a bonding electron pair,
- X represents a group $R^2$, a siloxane group or a bonding electron pair to Y or may be bonded to Y or X combines with Y to denote an oxygen atom or denotes an oxygen atom attached to Y,
- Y may assume meanings selected from the meanings of $R^2$ or $Q^1$ or $Q^2$ or represents a siloxane moiety or a hydrolysable group inclusive hydroxyl or combines with Z to represent a bonding electron pair and may be attached to Z via X and may be interrupted by one or more optionally substituted siloxane groups or combines with X to denote an oxygen atom,
with the proviso that Y in the case of n=1 denotes a hydrolysable group or a siloxane moiety which contains at least one hydrolysable group or combines with X to denote an oxygen atom or is attached to X or combines with Z to represent a bond,
- s assumes values of at least 1,
- r assumes values of at least 1,
- n assumes values of at least 1,
- t assumes values of at least 0,
- n assumes values of at least 1,
- the sum s+t assumes the value of r,
- k, m, p, q denote values not less than zero, with the proviso that the sum k+m+p+q denotes a sum of at least 2,
- a assumes the value 0 or 1.

The definitions whereby two groups, for example X, Y and/or Z, combine in the abovementioned possible combinations to form a bond or an oxygen atom can be elucidated using the example of compounds 1 and 2:

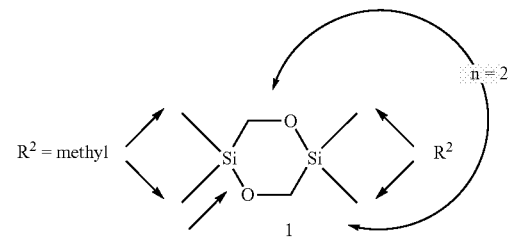

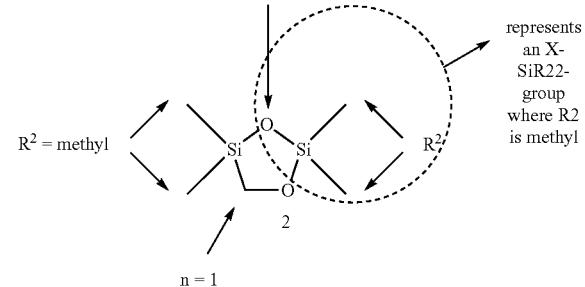

In compound 1 all $R^2$ moieties are methyl, n is 2 and Y combines with Z to represent a bonding electron pair. In compound 2, $R^2$ is methyl, n is 1, Z represents an X—$SiR^2_2$— group (again with $R^2$ being methyl) and X combines with Y to denote an oxygen atom.

Compounds that include at least one unit of the general formula III are hereinbelow called "compounds of formula III" for simplicity.

The compounds of formula II and of formula III or mixtures containing these compounds may be prepared, mixed and added to each or one another in any order, optionally even repeatedly, optionally even alternatingly, in the method of the present invention. The method of the present invention utilizes at least one compound of formula II and at least one compound of formula III; it is also possible to use two, three, four, five, six or more compounds of formula II or of formula III, simultaneously or in succession, optionally even repeatedly, optionally even alternatingly. The method of the present invention produces at least one (hydroxymethyl)polysiloxane/(hydroxymethyl)polysiloxane resin of formula I; it is also possible for two, three, four, five, six or more compounds of formula I to be produced side by side. The compounds which are used of formula III can be free of solvolysates or for example include their solvolysates, for example with alcohols, water or silanols.

When compounds containing units of the general formula III are used for functionalizing Si—OH groups in organosiloxanes/organosiloxane resins of the general formula II, these react surprisingly easily and specifically with good yields with silanol groups to form carbinols.

When compounds containing units of the general formula III are used for functionalizing Si—OH groups in organosiloxanes/organosiloxane resins of the general formula II, the $CH_2OH$ groups in the (hydroxymethyl)siloxane units produced by the method of the present invention are generated by Si—O bond cleavage and O protonation of a grouping of the structure $Si(R^2{}_2)CH_2O$—Si, or the $CH_2OH$ groups are already present as such when Z in formula III is chosen to be hydrogen.

This distinguishes the method of the present invention from the prior art methods for producing (hydroxymethyl) polysiloxanes and (hydroxymethyl)poly-siloxane resins. The prior art methods for producing (hydroxymethyl)polysiloxanes or (hydroxymethyl)poly-siloxane resins utilize or produce precursor siloxanes which bear a grouping of the structure siloxane-$CH_2$-A. The group A therein constitutes an acyloxy radical or a halogen atom and is converted into OH groups under harsh conditions, for example with alkali metal hydroxides (A=halogen) or with alcohols by acid catalysis or with boron hydrides (A=acyloxy). The harsh reaction conditions frequently lead to rearrangements of the siloxane scaffold or to unintended descendant reactions at the produced hydroxymethyl groups such as, for example, cleavage of Si—C bonds. Furthermore, siloxanes comprising a siloxane-$CH_2$-A (A=halogen or acyloxy) grouping are not standard products, but have to be specifically produced as a precursor. In contradistinction thereto, the method of the present invention provides for surprisingly easy conversion of SiOH groups into (hydroxymethyl)siloxane units, so that for example the SiOH groups to be functionalized which are to be converted into (hydroxymethyl)siloxane units are themselves sufficiently reactive to effect the generation of $CH_2OH$ groups as described, although promoters or catalysts may optionally be used. Moreover, the organopolysiloxanes or organopolysiloxane resins of formula II used in the method of the present invention are standard products in the silicone industry and accordingly do not have to be specially produced as a precursor for the synthesis of (hydroxymethyl)polysiloxanes or (hydroxymethyl)poly-siloxane resins.

$R^1$ and $R^2$ are preferably of 1 to 12 carbon atoms, especially 1 to 6 carbon atoms, preferably at just carbon atoms and hydrogen atoms, or one alkoxy oxygen atom and otherwise just carbon atoms and hydrogen atoms.

Preferably $R^1$ and $R^2$ are straight-chain or branched or cyclic $C_1$-$C_6$ hydrocarbon moieties. Methyl, ethyl, phenyl, allyl and vinyl are preferred for $R^1$ and methyl is particularly preferred. Methyl, ethyl, phenyl, allyl, vinyl, methoxy and ethoxy are preferred for $R^2$ and methyl, ethyl, phenyl, allyl and vinyl are particularly preferred, especially methyl.

Preference is given to producing compounds of the general formula I where $R^1$ and $R^2$ are each methyl.

$Q^1$ is preferably a fluorine, chlorine, bromine, iodine, cyanato, isocyanato, cyano, nitro, nitrato, nitrito, silyl, silylalkyl, silylaryl, siloxy, siloxaneoxy, siloxyalkyl, siloxaneoxyalkyl, siloxyaryl, siloxaneoxyaryl, hydroxyl, alkoxy, aryloxy, acyloxy, S-sulfonato, O-sulfonato, sulfato, S-sulfinato, O-sulfinato, amino, alkylamino, arylamino, dialkylamino, diarylamino, arylalkylamino, acylamino, imido, sulfonamido, imino, mercapto, alkylthio or arylthio substituent, O-alkyl-N-carbamato, O-aryl-N-carbamato, N-alkyl-O-carbamato, N-aryl-O-carbamato, optionally alkyl- or aryl-substituted P-phosphonato, optionally alkyl- or aryl-substituted O-phosphonato, optionally alkyl- or aryl-substituted P-phosphinato, optionally alkyl- or aryl-substituted O-phosphinato, optionally alkyl- or aryl-substituted phosphino, hydroxycarbonyl, alkoxycarbonyl, aryloxycarbonyl, cyclic or acyclic carbonate, alkylcarbonato or arylcarbonato substituent, more preferably a fluorine, chlorine, bromine, iodine, cyanato, isocyanato, cyano, silyl, silylalkyl, silylaryl, siloxy, siloxaneoxy, siloxyalkyl, siloxaneoxyalkyl, siloxyaryl, siloxaneoxyaryl, hydroxyl, alkoxy, aryloxy, acyloxy, S-sulfonato, sulfato, amino, alkylamino, arylamino, dialkylamino, diarylamino, arylalkylamino, acylamino, imido, sulfonamido, imino, mercapto, alkylthio or arylthio substituent, O-alkyl-N-carbamato, O-aryl-N-carbamato, N-alkyl-O-carbamato, N-aryl-O-carbamato, optionally alkyl- or aryl-substituted P-phosphonato, optionally alkyl- or aryl-substituted O-phosphonato, optionally alkyl- or aryl-substituted P— optionally alkyl- or aryl-substituted phosphino, hydroxycarbonyl, alkoxycarbonyl, or aryloxycarbonyl substituent.

$Q^2$ is preferably a heteroatom-containing divalent radical, for example —O—, —S—, —N($R^4$)—, —C(O)—, epoxy, —C(O)—O—, —O—C(O)—O—, —O—C(O)—N($R^4$)—, —N($R^4$)—C(O)—O—, —S(O)—, —S(O)$_2$—, —S(O)—O—, —S(O)$_2$—O—, —O—S(O)$_2$—O—, —C(O)—N($R^4$)—, —S(O)$_2$—N($R^4$)—, —S(O)$_2$—N[C(O)$R^6$]—, —O—S(O)$_2$—N($R^4$)—, —N($R^4$)—S(O)$_2$—O—, —P(O)(O$R^5$)—O—, —O—P(O)(O$R^5$)—, —O—P(O)(O$R^5$)—O—, —P(O)(O$R^5$)—N($R^4$)—, —N($R^4$)—P(O)(O$R^5$)—, —O—P(O)(O$R^5$)—N($R^4$)—, —N($R^4$)—P(O)(O$R^5$)—O—, —N[C(O)$R^6$]—, —N=C($R^6$)—O—, —C($R^6$)=N—O—, —C(O)—N[C(O)$R^6$]—, —N[S(O)$_2$$R^7$]—, —C(O)—N[S(O)$_2$$R^7$]—, —N[P(O)$R^8{}_2$]—, —Si($R^2{}_2$)—, —[Si($R^2{}_2$)O]$_o$—, —[OSi($R^2{}_2$)]$_o$—, —[OSi($R^2{}_2$)]$_o$O—, more preferably —O—, —S—, —N($R^4$)—, —C(O)—, epoxy, —C(O)—O—, —O—C(O)—N($R^4$)—, —N($R^4$)—C(O)—O—, —S(O)—, S(O)$_2$—, S(O)$_2$—, S(O)$_2$—O—, —O—S(O)$_2$—O—, —C(O)—N($R^4$)—, —S(O)$_2$—N($R^4$)—, —S(O)$_2$—N[C(O)$R^6$]—, —O—S(O)$_2$—N($R^4$)—, —N($R^4$)—S(O)$_2$—O—, —P(O)(O$R^5$)—O—, —O—P(O)(O$R^5$)—, —O—P(O)(O$R^5$)—O—, —N[C(O)$R^6$]—, —N=C($R^6$)—O—, —C($R^6$)=N—O—, —C(O)—N[C(O)$R^6$]—, —N[S(O)$_2$$R^7$]—, —C(O)—N[S(O)$_2$$R^7$]—, —N[P(O)$R^6{}_2$]—, —Si($R^2{}_2$)—, —[Si($R^2{}_2$)—O]$_o$—, —[OSi($R^2{}_2$)]$_o$—, —[OSi($R^2{}_2$)]$_o$O—, where $R^4$, $R^5$ and $R^6$ represent hydrogen or optionally substituted $C_1$-$C_{20}$-alkyl or $C_6$-$C_{20}$-aryl moieties, $R^7$ represents an optionally substituted $C_1$-$C_{20}$-alkyl or $C_6$-$C_{20}$-aryl moiety, $R^8$ represents an optionally substituted $C_1$-$C_{20}$-alkyl, $C_6$-$C_{20}$-aryl, $C_1$-$C_{20}$-alkoxy or $C_6$-$C_{20}$-aryloxy moiety and o represents a number from 1 to 100, preferably 1 to 10, or a heteroatom-containing trivalent radical, for example —N= or —P=.

The hydroxyl-functional organosiloxane of the general formula II may be for example linear, cyclic or branched.

The sum of k, m, p, q, s and t is preferably a number from 3 to 10 000, more preferably 4 to 1000 and even more preferably 5 to 200. The sum of k, m, p, q and r is preferably a number from 3 to 10 000, more preferably 4 to 1000 and even more preferably 5 to 200. The sum of k, m, p and q is preferably a number from 2 to 10 000, more preferably 3 to 1000 and even more preferably 4 to 200. The recited sums relate to the average chain lengths (number average) of the respective siloxanes. It is preferable for the groups [$O_{1/2}$H] or the groups [$O_{1/2}$—(Si$R^2{}_2$—X—Y—)$_a$Si$R^2{}_2$—$CH_2$—OH] to be attached to ($R^1{}_2$Si$O_{2/2}$) groups.

k is preferably a number from 0 to 50, more preferably 0 to 5, even more preferably 0 to 1, especially 0.

m is preferably a number from 0 to 100, more preferably 0 to 10, even more preferably 0 to 1, especially 0.

p is preferably a number from 0 to 10 000, more preferably 1 to 1000, even more preferably 2 to 200.

q is preferably a number from 0 to 100, more preferably 0 to 10, even more preferably 0 to 1, especially 0.

s is preferably a number from 1 to 100, more preferably 1 to 10, even more preferably 1 to 2, especially 2.

r is preferably a number from 1 to 100, more preferably 1 to 10, even more preferably 1 to 2, especially 2.

t is preferably a number from 0 to 99, more preferably 0 to 9, even more preferably 0 to 1, especially 0.

The variable a in formula I preferably assumes the value 0. It is preferable for the groups $[O_{1/2}H]$ to be attached to $(R^1_2SiO_{2/2})$ groups. It is preferable for the groups $[O_{1/2}-(SiR^2_2-X-Y-)_a SiR^2_2-CH_2-OH]$ to be attached to $(R^1_2SiO_{2/2})$ groups.

The variable n in formula III preferably assumes values not less than 2, more preferably values from 2 to 100 and even more preferably from 2 to 20. The variable n may assume for example the values 1, 2, 3, 4, 5 or 6-20 or greater.

Y in formula III preferably combines with Z to denote a bond or Z denotes an $X-SiR^2_2-$ group, where X combines with Z to denote an oxygen atom or a siloxane group bonded to Z; it is more preferable for Y to bind with Z to denote a bond. The latter particularly preferable case results in cyclic compounds of formula III which consist exclusively of $[O-CH_2-SiR^2_2]_n$ units.

A preferred variant of an organosiloxane of the general formula II is a linear silicone polymer where k and m are equal to 0, p is not less than 1, q is 0 or 1 and r is 1 or 2 subject to the condition that r+q is 2, while it is more preferable for q to be 0, p to be not less than 2 and r to be 2. Preferably p here is in the range from 3 to 10 000, more preferably in the range from 4 to 1000 and even more preferably in the range from 5 to 200. The recited p values relate to the average chain lengths (number average) of the siloxanes. Preferably r is s. The preferred organosiloxanes of the general formula II may form either a monomodal distribution or a bimodal distribution or a multimodal distribution, while at the same time they may be in a narrow or very broad molar mass distribution.

A further preferred variant of a branched organosiloxane used of the general formula II is an organosilicone resin. This resin may consist of multiple units, as shown by the general formula II, in which case the mole percentages of the units present are indicated by the indices k, m, p, q, r, s and t. Preference is given to a value of 0.1 to 20 mol % of units r, based on the sum total of k, m, p, q and r. At the same time, however, k+m has to be >0. In the production of the organosiloxane resin of the general formula I, s has to be >0 and s+t has to be equal to r.

Preference is given to producing resins wherein 5 mol %<k+m<90 mol %, based on the sum total of k, m, p, q, s and t and t is preferably 0. In a particularly preferred case, $R^1$ and $R^2$ are each methyl.

The units $(SiO_{4/2})$, $(R^1SiO_{3/2})$, $(R^1_2SiO_{2/2})$, in formula I and respectively the units $(SiO_{4/2})$, $(R^1SiO_{3/2})$, $(R^1_2SiO_{2/2})$ in formula II can also for example appear with multiple repetition, for example as blocks or as individual or as alternating units.

The units $(R^1_3SiO_{1/2})$, $[O_{1/2}-(SiR^2_2-X-Y-)_a SiR^2_2-CH_2-OH]$, $[O_{1/2}H]$ in formula I and respectively the units $(R^1_3SiO_{1/2})$, $[O_{1/2}H]$ in formula II may appear for example at multiple points of the polymer backbone, for example in an ordered distribution or in a random distribution.

In a preferred method for producing (hydroxymethyl)-polysiloxanes/(hydroxymethyl)polysiloxane resins, the silanol-containing organosiloxanes/organosiloxane resins used of formula II are compounds conforming to the following formula IIa:

$$H[OSiR^{11}_2]_\alpha OH \qquad \text{formula IIa,}$$

where α denotes whole-numbered values of 2 to 20 000 and $R^{11}$ denotes methyl, ethyl, vinyl, allyl or phenyl.

α is preferably from 3 to 10 000, more preferably 4 to 1000 and even more preferably 5 to 200.

The values recited for a relate to the average chain lengths (number average) of the siloxanes.

$R^{11}$ is preferably methyl, ethyl, vinyl or phenyl, more preferably methyl or vinyl and even more preferably methyl.

Formula IIa emerges from formula II when, in formula II, the $R^{11}$ moieties assume the meaning $R^{11}$ and k, m and q all assume the value 0, r assumes the value 2 and p assumes the value α, while α can assume the values as defined above.

In a preferred method for producing (hydroxymethyl)-polysiloxanes/(hydroxymethyl)polysiloxane resins, the formula III compounds used are compounds conforming to the following formula IIIa:

$$Z-[O-CH_2-SiR^{12}_2]_n-Y \qquad \text{formula IIIa,}$$

where $R^{12}$ may assume the meanings methyl, ethyl, vinyl, allyl, phenyl, methoxy, ethoxy, n-propoxy, isopropoxy, n-butoxy, isobutoxy, sec-butoxy, tert-butoxy, n-pentoxy, tert-pentoxy or n-hexoxy, and n, Y and Z may assume the same meanings as defined above.

$R^{12}$ is preferably methyl, ethyl, vinyl, allyl, phenyl, methoxy or ethoxy, more preferably methyl, ethyl, vinyl, allyl or phenyl and even more preferably methyl.

n, Y and Z in formula IIIa preferably, more preferably and even more preferably assume the meanings defined above in relation to formula III as more preferable and even more preferably respectively.

Formula IIIa emerges from formula III when, in formula III, the $R^2$ moieties assume the meaning $R^{12}$, while n, Y and Z may assume the same values as defined above in relation to formula III.

In a preferred method for producing (hydroxymethyl)polysiloxanes/(hydroxymethyl)polysiloxane resins, the formula I product produced are the following compounds of formula Ia:

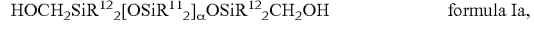

$$HOCH_2SiR^{12}_2[OSiR^{11}_2]_\alpha OSiR^{12}_2 CH_2OH \qquad \text{formula Ia,}$$

where α denotes whole-numbered values of 2 to 20 000 and $R^{11}$ and $R^{12}$ have the above-defined meanings, by reacting compounds of formula IIa with compounds of formula IIIa. α therein is preferably from 3 to 10 000, more preferably 4 to 1000 and even more preferably 5 to 200.

The values recited for α relate to the average chain lengths (number average) of the siloxanes.

The amount of substance ratio of compounds of formula II which were selected from the possibilities defined for formulae IIa to compounds of formula III which were selected from the possibilities defined for formulae IIIa is preferably chosen such that the amount of substance ratio of silanol groups in formula IIa to the amount of substance ratio of $[OCH_2SiR^{12}_2]$ units in formula IIIa, based on the number of their occurrences n in formula IIIa, is preferably in the range from 0.8 to 1.2, more preferably in the range from 0.9 to 1.1 and even more preferably 1.0. "Based on the number of their occurrences n in formula IIIa" here is to be understood as meaning that for example for n=2 the $[OCH_2SiR^{12}_2]_n$ unit is reckoned as two [$OCH_2SiR^{12}_2$] units, for example for n=3 as three [$OCH_2SiR^{12}_2$] units, and so forth.

It is preferable for the compounds used as including a unit of the general formula III to be compounds of the following general formulae IV-VIII:

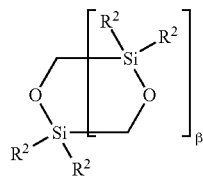

formula IV

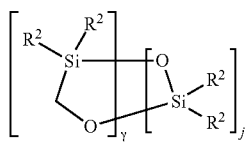

formula V

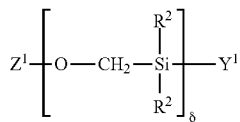

formula VI

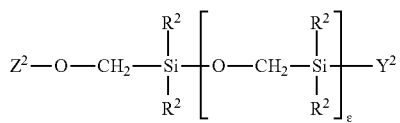

formula VII

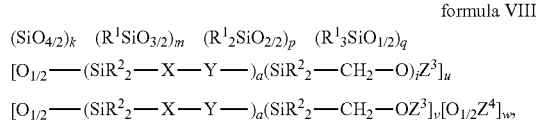

formula VIII ($SiO_{4/2}$)$_k$  ($R^1SiO_{3/2}$)$_m$  ($R^1_2SiO_{2/2}$)$_p$  ($R^1_3SiO_{1/2}$)$_q$

[$O_{1/2}$——($SiR^2_2$—X—Y—)$_a$($SiR^2_2$—$CH_2$—O)$_i Z^3$]$_u$

[$O_{1/2}$——($SiR^2_2$—X—Y—)$_a$($SiR^2_2$—$CH_2$—O$Z^3$]$_v$[$O_{1/2}Z^4$]$_w$, where

- $R^1$ in the formula VIII may assume the same meanings as defined above and in formula VIII assumes preferably, more preferably or even more preferably the meanings defined above as respectively preferable, more preferable or even more preferable for $R^1$,
- $R^2$ in the formulae IV-VIII may assume the same meanings as defined above and in the formulae IV-VIII preferably, more preferably or even more preferably assumes the meanings defined above as respectively preferable, more preferable and even more preferable for $R^2$, or where $R^2$ in preferred embodiments assumes the meaning $R^{12}$, with the meanings, preferably the preferred and particularly preferred meanings defined above for $R^{12}$,
- β, γ, δ, ε may assume the same meanings as n as defined above, and preferably the same meanings 1-100, more preferably 1-30 and even more preferably the meanings 1-10,
- i may assume a whole-numbered value not less than 2 and preferably assumes the meanings 2-100, preferably 2-30 and more preferably the meanings 2-10,
- j in formula V denotes a whole-numbered value not less than 0 and preferably assumes the values not less than 1, more preferably values of 1-20 and even more preferably values of 1-10,
- k, m, p and q and their above-defined sum in formula VIII may assume the same values as defined above and preferably, more preferably and even more preferably, respectively, assume the same values as defined above as preferable, more preferable and even more preferable, respectively, for respectively k, m, p and q and for their sum,
- u in formula VIII may assume a value not less than 1 and preferably assumes the meanings 1-20, more preferably 1-10 and even more preferably the values 1 or 2,
- v in formula VIII may assume a value not less than 0 and preferably assumes the meanings 0-20, more preferably 0-10 and even more preferably the values 0, 1 or 2,
- w in formula VIII may assume a value not less than 0 and preferably assumes the values 0-20, more preferably 0-10 and even more preferably the value 0,
- $Y^1$ in formula VI represents a moiety $R^2$, a moiety —O—($SiR^2_2$—$CH_2$—O)$_b Z^1$, a hydrogen atom or a hydrolysable group, preferably a hydroxyl group, a $C_1$-$C_{20}$ alkoxy group, a $C_6$-$C_{20}$ aryloxy group or a $C_1$-$C_{40}$ polyether group, especially a hydroxyl group, a methoxy group or an ethoxy group,
- with the proviso that $Y^1$ when δ in formula VI assumes the meaning 1 represents a hydrolysable group inclusive alkoxy, aryloxy, or hydroxyl, or a hydrogen atom, or represents a moiety —O—($SiR^2_2$—$CH_2$—O)$_b$H with b not less than 2,
- b represents values not less than 1 and preferably represents values not less than 2, more preferably 2-30 and even more preferably 2-10,
- $Y^2$ in formula VII represents a moiety $R^2$, a moiety —O—($SiR^2_2$—$CH_2$—O)$_c Z^2$, a hydrogen atom or a hydrolysable group inclusive hydroxyl, preferably a hydroxyl group, a $C_1$-$C_{20}$ alkoxy group, a $C_6$-$C_{20}$ aryloxy group or a $C_1$-$C_{40}$ polyether group, especially a hydroxyl group, a methoxy group or an ethoxy group,
- c represents values not less than 1 and preferably represents values not less than 2, more preferably 2-30 and even more preferably 2-10,
- $Z^1$ represents a hydrogen atom, a silyl group attached via a silicon atom or a siloxanyl group attached via a silicon atom and preferably represents a hydrogen atom,
- $Z^2$ represents a hydrogen atom, a silyl group attached via a silicon atom, a siloxanyl group attached via a silicon atom, or—when ε in formula VII assumes a value not less than 2 or $Y^2$ is a hydrolysable group— represents an alkyl, aryl or acyl group optionally substituted with $Q^1$ or interrupted by one or more groups $Q^2$, and preferably represents a hydrogen atom,
- $Z^3$ represents a hydrogen atom, a silyl group attached via a silicon atom, a siloxanyl group attached via a silicon atom, or—when i in formula VIII assumes a value not less than 3—represents an alkyl, aryl or acyl group optionally substituted with $Q^1$ or interrupted by one or more groups $Q^2$, and preferably represents a hydrogen atom,
- $Z^4$ may assume the same meanings as $Z^1$,
- a may assume the same meanings as defined above and preferably assumes the value 0.

i may assume for example the values 2, 3, 4, 5, 6, 7, 8, 9, 10 or greater.

j, v, w may assume for example the values 0, 1, 2, 3, 4, 5, 6, 7, 8, 9, 10 or greater.

β, γ, δ, ε, u may assume for example the values 1, 2, 3, 4, 5, 6, 7, 8, 9, 10 or greater.

When $Z^4$ assumes meanings selected from groups presentable by $R^1_3Si$, then [$O_{1/2}Z^4$] is also presentable by ($R^1_3SiO_{1/2}$) with q increasing by 1 and w decreasing by 1.

The units [$SiR^2$—$CH_2$—O—]$_γ$ and [$SiR^2$—O]$_j$ in formula V may also appear for example in multiple repeats, for example as blocks or as individual or as an alternating units.

The units $(SiO_{4/2})$, $(R^1SiO_{3/2})$, $(R^1{}_2SiO_{2/2})$, $(SiR^2{}_2—X—Y—)$, $(SiR^2{}_2—CH_2—O)$ in formula VIII may also appear for example as multiple repeats, for example as blocks or as individual or as alternating units.

The units $(R^1{}_3SiO_{1/2})$, $[O_{1/2}—(SiR^2{}_2—X—Y—)_z(SiR^2{}_2—CH_2—O)_iZ^3]$, $[O_{1/2}—(SiR^2{}_2—X—Y—)_aSiR^2{}_2—CH_2—OZ^3]$, $[O_{1/2}Z^4]$ in formula VIII may appear for example at multiple points of the polymer backbone, for example in an ordered distribution or in a random distribution.

In a preferred method, at least one of the formula III compounds used is selected from the compounds conforming to the following formula IIIb:

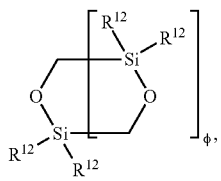

formula IIIb where $R^{12}$ may assume the same meanings as defined above and where $R^{12}$ in formula IIIb preferably, more preferably and even more preferably assumes the meanings as defined above as respectively preferable, more preferable and even more preferable for $R^{12}$, and where 9 may assume whole-numbered values not less than 1 and preferably assumes values of 1 to 10, more preferably the values 1 or 2 and even more preferably 1.

Particular preference is for the compounds used as including at least one unit of the general formula III to be the hereinbelow shown compounds numbered 1 to 4, where the compounds 4a to 4u constitute representatives of structure 4,

1

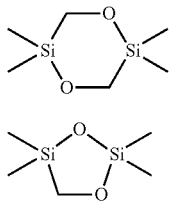

2

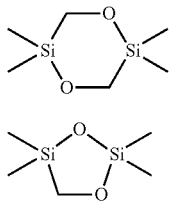

3

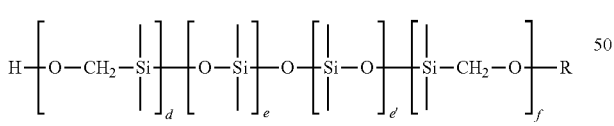

where d may assume whole-numbered values not less than 1, e may assume whole-numbered values not less than 0, e' may assume whole-numbered values not less than 0 and f may assume whole-numbered values of 0 or not less than 2, and where R may assume the meanings hydrogen, methyl, ethyl, n-propyl, isopropyl, n-butyl, sec-butyl, isobutyl, tert-butyl, n-pentyl, sec-pentyl(1-methylbutyl or 1-ethylpropyl), isopentyl(2-methylbutyl or 3-methylbutyl), neopentyl, tert-pentyl, n-hexyl, n-octyl, benzyl, phenyl, 2-methylphenyl, 3-methylphenyl, 4-methylphenyl, cyclopentyl or cyclohexyl, and where R in the case when f is unlike 0 denotes hydrogen, and where d in the case when e is 0 and e' is 0 and f is 0 may assume whole-numbered values not less than 2,

4

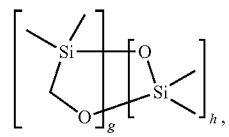

where g may assume whole-numbered values not less than 1 and h may assume whole-numbered values not less than 0 and the sum of g+h may assume whole-numbered values not less than 3, 4a

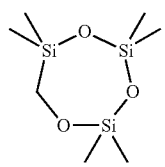

4b

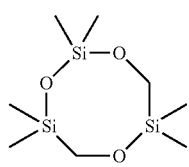

4c

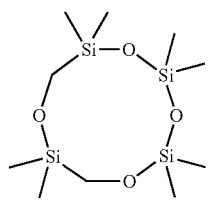

4d

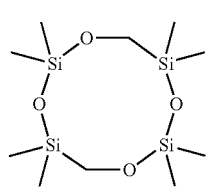

4e

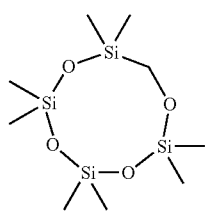

4f

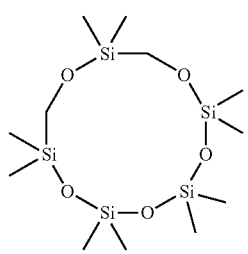

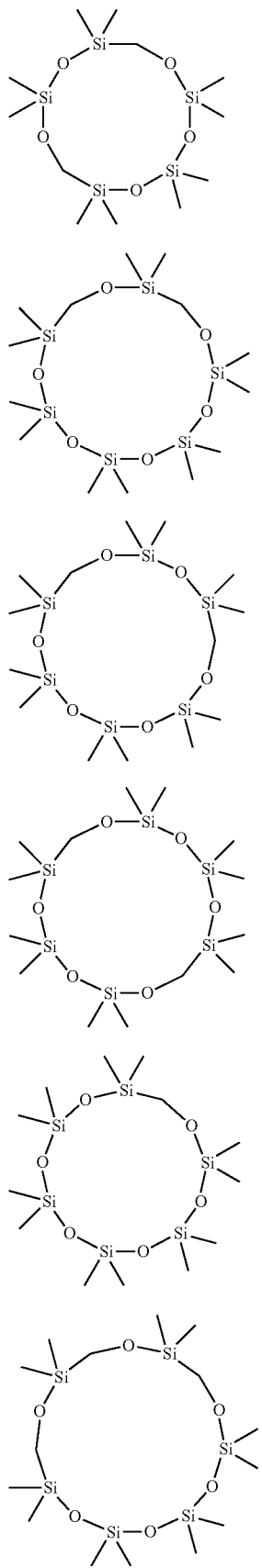
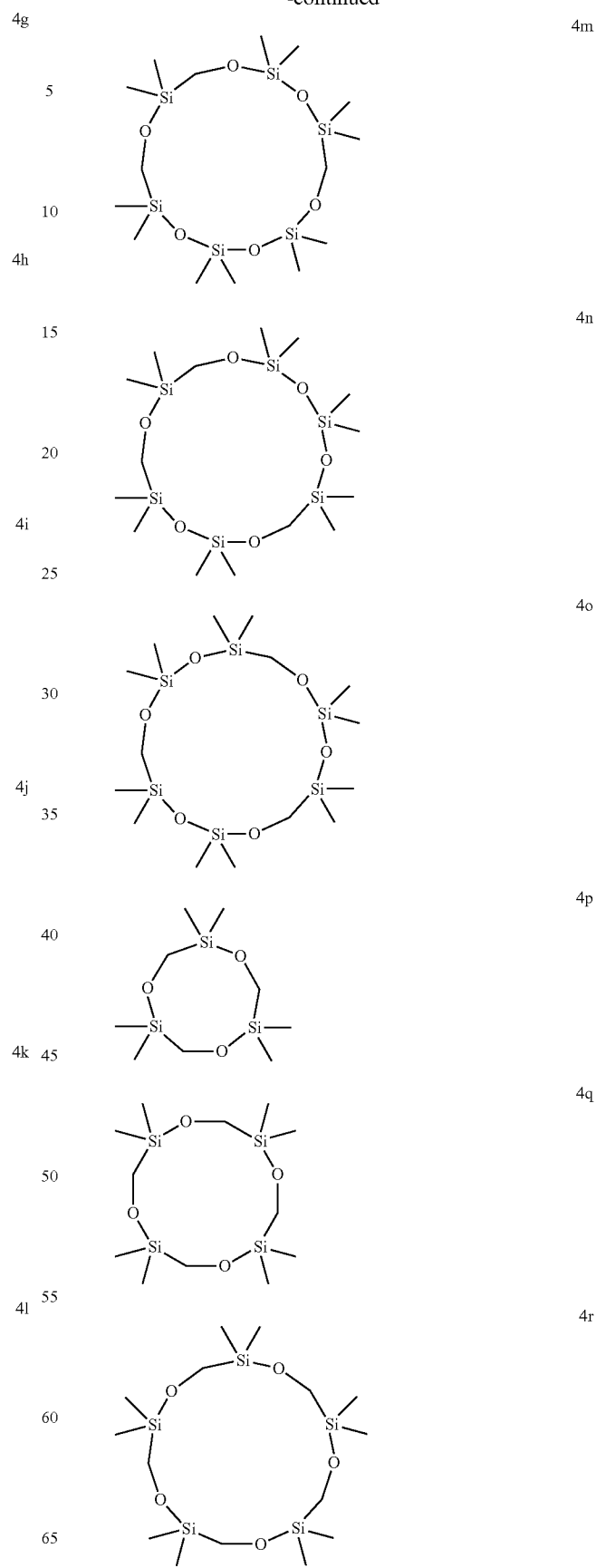

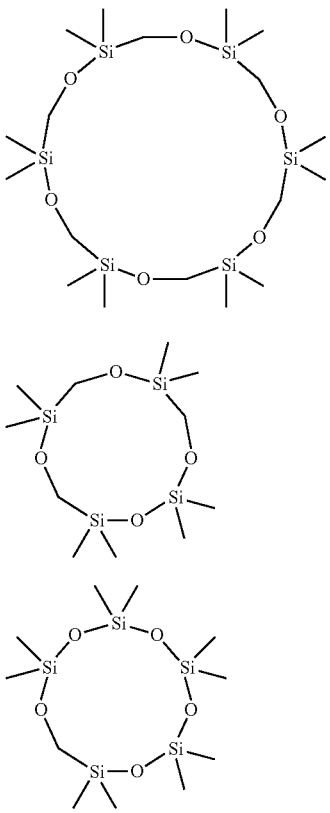

The invention further provides the compounds of formula III having the structures 3 and 4.

The repeat units [O—CH$_2$—SiMe$_2$]$_d$ and [—O—SiMe$_2$]$_e$ or respectively [SiMe$_2$—O—]$_e$, and [SiMe$_2$-CH$_2$—O—]$_f$ in structure 3 each may appear in multiple repeats for example as blocks or as individual as alternating units, for example in a random distribution.

The repeat units [SiMe$_2$-CH$_2$—O—]$_g$ and [SiMe$_2$—O—]$_h$ in structure 4 may appear in multiple repeats for example as blocks or as individual or as alternating units, for example in a random distribution.

A method for producing compounds of the structure 3, which comprises reacting compounds of structure 1, 2 or 4, with water or alcohols, likewise forms part of the subject matter of the present invention. The compounds of structure 3 are obtainable from the compounds of structure 1, 2 or 4 by solvolysis with water or alcohols, optionally in the presence of at least one catalyst. The choice of the R moiety in the chosen solvolysis reagent ROH determines the identity of the R moiety in the product of structure 3.

A method for producing compounds of the structure 4, which comprises compound 1 being stored or heated in the presence of an amount of substance of [Me$_2$SiO] equivalents which is at least equal to the sum of the amount of substance of [SiMe$_2$-O—] groups in the compounds 4 to be produced. The compounds of structure 4 are obtainable from the compound 1 by heating or sufficiently long storage, optionally in the presence of at least one catalyst, while the ratio of the values of h to g in the products of structure 4 which are thus obtainable is directable by addition of Me$_2$SiO— equivalents, for example in the form of cyclic dimethylsiloxanes, such as hexamethylcyclotrisiloxane, octamethylcyclotetrasiloxane or decamethylcyclopentasiloxane. The greater the number of Me$_2$SiO— equivalents added, the greater the h:g ratio. The minimum is a ratio of h:g=0, i.e., in this case the sum total of the amount of substance of SiMe$_2$-O— groups in the structure 4 compounds to be produced becomes equal to zero and accordingly at least zero Me$_2$SiO— equivalents have to be added in the method in this case. The pure compound 1 (>98%, GC) is storable at room temperature without added catalyst for more than 6 months without noticeable change.

d is preferably from 2 to 100, more preferably from 2 to 30 and especially from 2 to 10.

e is preferably from 0 to 200, more preferably from 0 to 10 and even more preferably 0.

e' is preferably from 0 to 200, more preferably from 0 to 10 and even more preferably 0.

f is preferably 0 or from 2 to 100, more preferably 0 or from 2 to 30 and even more preferably 0.

R is preferably hydrogen, methyl, ethyl, n-propyl, isopropyl, n-butyl, sec-butyl, isobutyl, tert-butyl, n-pentyl, n-hexyl, n-octyl, benzyl, phenyl, 2-methylphenyl, 3-methylphenyl, 4-methylphenyl, cyclopentyl or cyclohexyl, more preferably hydrogen methyl, ethyl, n-propyl, n-butyl, n-pentyl, n-hexyl or n-octyl and even more preferably hydrogen, methyl or ethyl.

g is preferably from 1 to 10, more preferably from 1 to 5 and even more preferably 1, 2 or 3.

h is preferably from 0 to 10, more preferably 0 to 5 and even more preferably 0.

The sum g+h is preferably from 3 to 20, more preferably 3 to 10 and even more preferably 3 to 5.

The invention further provides a method for producing compounds of the general formula VIII. The compounds of formula VIII are obtainable by reacting mixtures containing compounds of the general formula II and/or of the general formula I preferably with an excess of compounds of formula IV, V, VI, VII or of a second compound of formula VIII, and choosing the remaining parameters of the method to be the same as in the production method for compounds of formula I. Excess means that the amount of substance of total structural units [OCH$_2$SiR$^2{}_2$] present in the compounds used of formula IV, V, VI, VII or in a second compound of formula VIII assumes a value greater than the amount of substance of total structural units [O$_{1/2}$H] present in the compounds used of formula I and II. In general, when the amount of substance ratios are chosen in this way, the structural units [O$_{1/2}$H] present in formula I or II react to form structural units of formula [O$_{1/2}$—(SiR$^2{}_2$—X—Y—)$_a$(SiR$^2{}_2$—CH$_2$—O)$_i$Z$^3$] or of formula [O$_{1/2}$—(SiR$^2{}_2$—X—Y—)$_a$(SiR$^2{}_2$—CH$_2$—OZ$^3$], so that w generally assumes the value 0 in the resulting product of formula VIII; however, under mild conditions for example, as for example without added catalyst or for example with a less reactive catalyst or for example at mild temperatures, for example below 120° C., the production of compounds of formula VIII can be performed such that w assumes a value not less than 1 in the resulting product of formula VIII.

When stoichiometric amounts are chosen for compounds of formula III, the structural units [O$_{1/2}$H] present in formula I or II may initially react to form structural units of formula [O$_{1/2}$—(SiR$^2{}_2$—X—Y—)$_a$(SiR$^2{}_2$—CH$_2$—O)$_i$Z$^3$], so that initial products formed are compounds of formula VIII where w initially assumes a value greater than 0. Stoichiometric means that the amount of substance of total structural units [OCH$_2$SiR$^2{}_2$] present in the compounds used of formula IV, V, VI, VII or a second compound of formula VIII assumes a value equal to the amount of substance of total structural units [O$_{1/2}$H] present in the compounds used of formula I and II. The structural units of the formula [O$_{1/2}$(SiR$^2{}_2$—CH$_2$—O)

$_tZ^3$] may, under suitable conditions, react with structural units [$O_{1/2}H$] still present in the reaction mixture; if this reaction goes to completion, the products obtained will be of the general formula I when the formula III compound used was selected from the compounds of formulae VI where $Z^1$ is hydrogen or from the compounds of formula VII where $Z^2$ is hydrogen or when the formula III compound used was selected from the compounds of formulae IV or V, and w assumes in these cases the value 0, u the value 0 and v the value s. In other words, compounds of formula VIII can appear as intermediate stages when using the method of the present invention for producing compounds of formula I from compounds of formula II.

When a compound of formula VIII was prepared from a compound of formula II, the sum u+v+w in the produced compound of formula VIII will assume the value of r in the formula II compound used.

Compounds of formula VIII may be converted into other compounds of formula VIII. For instance, different compounds of formula VIII may be equilibrated with each or one another to exchange the $SiR^2{}_2$—$CH_2$—O groups of each or one another, or i or v in formula VIII may be increased by further reaction with compounds of formula IV, V, VI or VII or reduced by reaction with compounds of formula I or of formula II. When the reaction of a compound of formula VIII with a compound of formula I or II is carried out using an excess of compounds of formula VIII, then i or v in the formula VIII compound originally used may be lowered, while the compound used of formula I or II may in turn be converted into a new compound of formula VIII.

Silylated compounds of formula I and silylated derivatives of compounds of the general formula I are obtainable by contacting the reaction mixture in which the compounds of formulae II and III are reacted with each other, or the compounds of formulae II or III, before, during or after the reaction of compounds of formulae II and III with each other, or at least one compound of formula I, with a silylating reagent, for example a chloro-, amino-, alkoxy-, hydroxytrialkyl-, -triaryl- or -triarylalkylsilane, or by selecting Z— in formula III such that the compound of formula III bears a silylating reagent in its structure, for example by selecting the group Z— in formula III from a trialkyl-, triaryl- or triarylalkylsilyl group, or by choosing a combination of these possibilities, in which case compounds are obtained of the general formula IX, $(SiO_{4/2})_k(R^1SiO_{3/2})_m(R^1{}_2SiO_{2/2})_p(R^1{}_3SiO_{1/2})_q[O_{1/2}-$
$(SiR^2{}_2-X-Y-)_a(SiR^2{}_2-CH_2-O)_lZ^5]_x$
$[O_{1/2}-(SiR^2{}_2-X-Y-)_a SiR^2{}_2-CH_2-OZ^5]_y$
$[O_{1/2}Z^6]_z$ 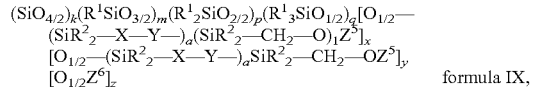 formula IX, where R$^1$ and R$^2$ may assume the same meanings as defined above, a, k, m, p and q may assume the same values as defined above, l may assume a whole-numbered value not less than 2 and preferably assumes the meanings 2-100, more preferably 2 to 30 and even more preferably 2-10, x may assume a value not less than 0 and preferably assumes the meanings 0-20, more preferably 0-10 and even more preferably 0, 1 or 2, y may assume a value not less than 0 and preferably assumes the meanings 0-20, more preferably 0-10 and even more preferably 0, 1 or 2, z may assume a value not less than 0 and preferably assumes the meanings 0-10, more preferably 0, 1 or 2 and even more preferably 0, x+y+z assumes the value r, $Z^5$ represents a silyl group attached via a silicon atom, a siloxanyl group attached via a silicon atom or represents a hydrogen atom, and $Z^6$ may assume the same meanings as $Z^5$, with the proviso that the groups $Z^5$ or $Z^6$ have to be at least partly selected from silyl groups.

$Z^5$ is preferably a silyl group attached via a silicon atom, or hydrogen and more preferably is hydrogen.

$Z^6$ is preferably a silyl group attached via a silicon atom or a siloxanyl group attached via a silicon atom, more preferably a silyl group attached via a silicon atom and even more preferably trimethylsilyl, triethylsilyl, triisopropylsilyl, tert-butyldimethylsilyl, dimethylphenylsilyl or methyldiphenylsilyl.

l may assume for example the meanings 2, 3, 4, 5, 6, 7, 8, 9, 10 or 11-30.

x, y and z may assume for example the meanings 0, 1, 2, 3, 4, 5, 6, 7, 8, 9, 10 or 11-20.

Preferably, in this method, the formula II compounds used are compounds of formula IIa and the formula III compounds used are compounds of formula IIIa, IIIb, IV, V, VI, VII or VIII, more preferably of formula IIIb and even more preferably of structure 1.

When $Z^6$ assumes meanings selected from groups presentable by $R^1{}_3Si$, then the [$O_{1/2}Z^6$] group is also presentable by $(R^1{}_3SiO_{1/2})$ with q increasing by 1 and z decreasing by 1. When the simultaneous choice is made of x as 0 and $Z^5$ as hydrogen, then the compound of formula IX corresponds to a compound of formula I. This is achievable for example by the silylating agent including the structure $R^1{}_3Si$-AG, where the AG group represents a hydrolysable leaving group.

Preferably, the compound of formula II is reacted with the silylating agent before the reaction with compound of formula III. Preferably, the sum total of amount of substance of silylating agent plus amount of substance of [$OCH_2SiR^2{}_2$] groups in formula III compound used is chosen to be stoichiometric or substoichiometric, based on the amount of substance of SiOH groups in the formula II compound used. AG is preferably a $C_1$-$C_{20}$ alkoxy group, a $C_6$-$C_{20}$ aryloxy group, a hydroxyl group, a halogen atom, a moiety attached via nitrogen, a hydrogen atom or an $OSiR^1{}_3$ group, more preferably a methoxy group, an ethoxy group, a hydroxyl group, a chlorine atom, a hydrogen atom, an $N(H)SiR^1{}_3$ group, an $N(alkyl)SiR^1{}_3$ group, an amino, alkylamino or dialkylamino group, an imidazole moiety or an $OSiR^1{}_3$ group.

Compounds of formula IX where x is above 0 are obtainable for example by using an excess of compounds of formula III, based on the amount of substance ratio of [$OCH_2Si$] structure elements in compounds of formula III to silanol groups in compounds of formula II.

Compounds of formula IX where x is above 0 may appear as intermediate stages in the course of the reaction of the production method even when no excess of compounds of formula III, based on the amount of substance ratio of [$OCH_2Si$] structure elements in compounds of formula III to silanol groups in compounds of formula II is used.

When compounds of formula I are reacted with a silylating reagent that includes the $R^1{}_3Si$-AG structure, the products obtained likewise conform to formula I with t being lowered by the number of OH groups which corresponds to the silylated equivalents and q being raised by the number of OH groups which corresponds to the silylated equivalents.

To produce, for example, resins which only have a defined content of hydroxyl groups (sum total of carbinol groups s+silanol groups t), the ratios between the resin and the compound having units of the general formula III are chosen such that the desired carbinol content is obtained. The remaining unconverted Si—OH groups may remain in the organofunctional siloxane of the general formula I, or—when a reduced level of silanol groups and hence of hydroxyl groups is desired—reacted before, during or after the reaction with at least one compound having units of the general formula III, with for example silazanes of the following general formula X

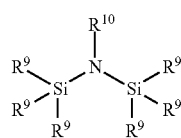

formula X where $R^9$ denotes hydrogen or an optionally —CN— or halogen-substituted $C_1$-$C_{10}$ hydrocarbon residue, and $R^{10}$ denotes hydrogen or an optionally —CN— or halogen-substituted $C_1$-$C_{10}$ hydrocarbon residue.

Preferably, the hydrocarbon moieties $R^9$ and $R^{10}$ have from to 5 carbon atoms. Methyl, ethyl and vinyl are particularly preferred. Hydrogen is preferred as $R^{10}$.

Reacting compounds of the general formulae VI, VII or VIII where $Z^1$ in formula VI, $Z^2$ in formula VII and $Z^3$ in formula VIII are each respectively other than hydrogen are reacted as compounds of formula III with compounds of formula II gives compounds of formula VIII where $Z^3$ or $Z^4$ are at least partly other than hydrogen. $Z^3$ may be for example a silyl group, a siloxanyl group or an alkyl, aryl or acyl group optionally substituted with $Q^1$ and $Z^4$ may be a silyl group or a siloxanyl group. $Z^3$ groups that are detachable by solvolysis with protic compounds can be wholly or partly converted into hydrogen by solvolysis of compounds of formula VIII, and i can be reduced down to 1. Full solvolysis of $Z^3$ groups and reduction of i to 1 gives compounds of formula I when $Z^4$ is chosen to be hydrogen or w chosen to be 0. Similarly, the $Z^5$ groups in compounds of formula IX can be wholly or partly converted into hydrogen by solvolysis and h can be reduced down to 1. Full solvolysis of $Z^5$ groups and reduction of h to 1 gives compound of formula I when $Z^6$ was chosen to be hydrogen or z chosen to be 0.

The invention further provides a method for solvolysis of compounds or intermediate stages obtainable on addition of a silylating agent, for example solvolysis of compounds of the general formula VIII or of formula IX. This method comprises reacting the silylated intermediate stages/compounds, for example compounds of the general formula VIII or IX, with water, an alcohol such as, for example, methanol, ethanol, propanol or butanol, in which case n-, sec-, iso- or tert-isomers of the alcohols can be used, a silanol such as, for example, triethylsilanol, an OH-functional siloxane (in which case compounds of formula II for example can be used as OH-functional siloxane) or else when $Z^3$ in formula VIII is an acyl group, with a primary or secondary amine such as, for example, ammonia, butylamine or diethylamine, or with a mixture containing one or more of these solvolysis reagents. The solvolysis method preferably involves the use of water or an alcohol for compounds of formula VIII or IX. It is preferable for the solvolysis process for compounds of formula VIII to be carried out with the parameters $Z^4$ equal to hydrogen or w equal to 0 and the solvolysis of $Z^4$ groups is carried out to completion and i is reduced to 1 by solvolysis, and so compounds of the general formula I are obtained.

It is preferable for the solvolysis process for compounds of formula IX to be carried out with the parameters $Z^6$ equal to hydrogen or z equal to 0 and the solvolysis of $Z^4$ groups is carried on to completion and 1 is reduced to 1 by solvolysis, and so compounds of the general formula I are obtained.

The aforementioned methods may preferably be carried out at temperatures of 0° C. to 250° C. It is more preferable, however, to use reaction temperatures of at least 10° C. to 150° C. and especially of 15° C. to 120° C. The methods may be carried out without catalysis. The methods can be improved by adding catalysts. These catalysts are acidic or basic compounds or metal compounds and have the effect of not only the reaction times but also reaction temperatures can be reduced. The catalyst used is preferably an organic or inorganic Lewis acid or Lewis base, or organic or inorganic Bronstedt acid or Bronstedt base, an organometallic compound or a halide salt. Preferred acids are carboxylic acids, partially esterified carboxylic acids, especially monocarboxylic acids, preferably formic acid or acetic acid, unesterified or partially esterified mono-, oligo- or polyphosphoric acids, unhydrolyzed or partially hydrolyzed phosphoronitrile chloride, sulfonic acids, alkyl hydrogensulfates or acidic ion exchangers. By way of preferred bases it is preferable to use alkylammonium hydroxides, ammonium alkoxides, alkylammonium fluorides or amine bases, guanidine bases or amidine bases. Preferred metal compounds are tin compounds, zinc compounds, aluminum compounds, bismuth compounds or titanium compounds. Preferred organometallic compounds are organotin compounds, organozinc compounds, organoaluminum compounds, organobismuth compounds or organotitanium compounds. Preferred salts are tetraalkylammonium fluorides.

The catalysts used are deactivated after the functionalization reaction of silanol groups, preferably by addition of so-called anti-catalysts or catalyst poisons, removed by distillation, decanting, centrifuging Or filtration, adsorbed on a carrier material, precipitated, complexed or extracted, before they are able to lead to any cleavage of Si—O—Si groups. This side-reaction is dependent on the catalyst used and need not necessarily occur, so that it may also be possible, as the case may be, to dispense with deactivating or with removing the catalyst. Examples of catalyst poisons are acids in the case of the use of bases and bases in the case of the use of acids, which in the final analysis leads to a simple neutralizing reaction. The reaction product formed between the catalyst and the catalyst poison can either be removed from the product, or remain in the product, depending on the use of the product. Examples of catalysts removable by distillation are carboxylic acids, for example formic acid, acetic acid, or amine bases, amidine bases or guanidine bases, for example triethylamine, tributylamine, ethyldiisopropylamine, ethylenediamine, tetramethylguanidine, 1,8-diazabicyclo[5.4.0]undec-7-ene, 1,5-diazabicyclo[4.3.0]non-5-ene or 1,4-diazabicyclo[2.2.2]octane. Examples of catalysts removable by decanting, filtration or by centrifuging are heterogeneous catalysts such as, for example, polymer-supported acids or bases, acidic or basic ion exchanger, or acidic or basic alumina. Examples of catalysts which can be adsorbed, complexed or precipitated are tin compounds, zinc compounds or titanium compounds.

Preference is given to using catalysts which can be removed from the product by distillation, more preferably distillatively removable nitrogen bases. The distillatively removable catalysts are characterized in that they, measured, on the catalyst as pure substance, have a vapor pressure of at least 1 hPa, preferably at least 10 hPa, more preferably at least 100 hPa and even more preferably at least 1000 hPa at temperatures up to at most 300° C., preferably at most 250° C., more preferably at most 210° C. and even more preferably at most 180° C.

In the method for producing hydroxyalkylpolysiloxanes of the general formula I, the amount of compound used as having units of the general formula III is dependent on the amount r of silanol groups to be functionalized in the organosiloxane of the general formula II. However, to achieve complete functionalization of OH groups, the compound having units of the general formula III must be added in at least equimolar amounts, based on n. When compound having units of the general formula III is used in excess, fully reacted compound may subsequently, optionally after thermolytic cleavage, be distilled off or solvolyzed, preferably hydrolyzed, and then optionally likewise be distilled off, or unconverted excess compound of formula III can be removed for example using the methods mentioned. Compounds of formula VIII may appear for example as intermediate stage in which the excess fully reacted equivalents of compounds of formula III can be detached by thermolysis or solvolysis to obtain compound of formula I.

Furthermore, the formula II organopolysiloxanes used in the method of the present invention may contain water which can react, in hydrolysis reactions, with the compounds of formula III or with formula VIII compounds which as the case may be can appear as intermediate stages during the execution of the method. The consequence is a corresponding extra consumption of compound of formula III. This can be allowed for by using correspondingly larger amounts of compound of the general formula III, preferably by additionally adding two moles of units of formula III, based on n, per mole of water. Methods of water determination such as for example Karl Fischer Titration or Headspace GC are common general knowledge. Possible hydrolysis products include for example compounds of structure 3 or 1,3-bis(hydroxymethyl)-1,1,3,3-tetramethyldisiloxane or (hydroxymethyl)dimethylsilanol. The compounds of structure 3 must be assigned to compounds of formula III and are thus able—once the water-based extra consumption described is corrected for—to further react the method of the present invention. The 1,3-bis (hydroxymethyl)-1,1,3,3-tetramethyldisiloxane does not correspond to a compound of formula III, since n is 1 on both sides of the siloxane oxygen atom and neither of the two silicon atoms bears a hydrolysable group. The hydrolysis products, such as 1,3-bis(hydroxymethyl)-1,1,3,3-tetramethyldisiloxane for example, can selectively remain in the product or be removed by, for example, distillative methods or application of vacuum, preferably by heating, after the method of the present invention has been carried out. Alternatively, the water can be removed via suitable methods, for example by distillation, application of vacuum, heating, reaction with water-scavenging reagents, adsorption on water-imbibing agents such as for example molecular sieves or alumina, drying by salts such as for example magnesium sulfate, sodium sulfate, calcium chloride or potassium carbonate, or by combination drying methods, for example by combination of the recited methods, for example combination of heating and application of vacuum, as is possible in a thin-film or short-path evaporator for example, from the formula II organopolysiloxane to be used before the method of the present invention is carried out. Removing the water before the method of the present invention is carried out is preferable. In this case, drying is preferably carried on to a residual water content of less than 10 000 ppm, more preferably less than 1000 ppm and even more preferably less than 200 ppm.

The methods can be carried out not only with solvents or else alternatively without the use of solvents in suitable reactors. Reduced pressure or superatmospheric pressure or atmospheric pressure (0.1 MPa absolute) is employed, if appropriate. The methods can be carried out in continuous operation or in batch operation.

Useful solvents include cyclic or acyclic hydrocarbons, ethers, esters, alcohols, amides, urea derivatives or halogenated organic compounds or solvent mixtures. When the solvents are used, the preference is for inert, especially aprotic solvents such as aliphatic hydrocarbons, for example, heptane or decane and aromatic hydrocarbons such as, for example, toluene or xylene. It is likewise possible to use ethers such as tetrahydrofuran, diethyl ether or methyl tert-butyl ether. The amount of solvent should be sufficient to ensure sufficient homogenization of the reaction mixture. Solvents or solvent mixtures having a boiling point/boiling range of up to 120° C. at 0.1 MPa absolute are preferable.

When alcohols are used as solvents, they can convert various compounds of formula III. For instance, methanol or ethanol can react for example with the compounds of structures 1, 2 or 4 to form compounds of the structure 3. It is similarly possible for alcoholic solvents to cleave the Z groups in compounds of formula III at the Si—$OCH_2$ bonds when Z was selected from groups of the formula $XR^2_2Si$, converting Z into hydrogen and, if appropriate, reducing n, if appropriate down to where n=1. The formula III compounds obtained by actions of alcohols can likewise be used in the method of the present invention.

The (hydroxymethyl)polysiloxanes or (hydroxymethyl)-polysiloxane resins produced by one of the aforementioned methods can be used for reaction with isocyanates, for producing urethanes, polyurethanes or polyurethane copolymers, for reaction with carboxylic acids or with carboxylic acid derivatives, or for producing esters, polyesters or polyester copolymers.

All the above symbols of the above formulae each have their meanings independently of each other unless expressly stated otherwise.

In the examples which follow, unless specifically stated otherwise, all amounts and percentages are by weight, all pressures are 0.10 MPa (abs.) and all temperatures are 20° C. All viscosities were determined at 25° C.

Example 1

Producing a Compound of General Formula I 1000 g of Me-siloxane (α,ω-bishydroxy-terminated polydimethylsiloxane having an Mn of 2930 g/mol, determined by $^1H$ NMR spectroscopy; corresponds to 341.3 mmol of polydimethylsiloxane having 682.6 mmol of SiOH groups) were reacted at 20° C. with 60.2 g (341.3 mmol) of 2,2,5,5-tetramethyl-2,5-disila-1,4-dioxacyclohexane (compound 1) and 0.5 g of tetramethylguanidine (catalyst) (500 ppm based on Me-siloxane. $^1H$ NMR and $^{29}Si$ NMR showed that after 2 hours all SiOH groups had been converted into Si—O—$SiMe_2$-$CH_2OH$ units (hydroxymethyl units). To remove the catalyst, the crude product was purified by thin film distillation (130° C., 10 mbar, 400 g/h). The catalyst passed over in the distillate, leaving behind pure α,ω-bis(hydroxymethyl) polydimethylsiloxane.

Example 2

Producing a Compound of the General Formula I

Example 1 is repeated except that 0.36 g of tetramethylguanidine (catalyst) (360 ppm based on Me-siloxane) is added. The reaction proceeds correspondingly slower and takes 6 hours to reach full conversion of SiOH groups. Purification is effected as in example 1.

Example 3

Producing a Compound of the General Formula I

Example 1 is repeated except that 0.25 g of tetramethylguanidine (catalyst) (250 ppm based on Me-siloxane) is added. The reaction proceeds correspondingly slower and takes 12 hours to reach full conversion of SiOH groups. Purification is effected as in example 1.

Example 4

Producing a Compound of General Formula I 1000 g of siloxane (α,ω-bishydroxy-terminated polydimethylsiloxane having an Mn of 900 g/mol, determined by $^1$H NMR spectroscopy; corresponds to 1.111 mol of siloxane having 2.222 mol of SiOH groups) were reacted at 20° C. with 196 g (1.111 mol) of 2,2,5,5-tetramethyl-2,5-disila-1,4-dioxacyclohexane (compound 1) and 0.5 g of tetramethylguanidine (catalyst) (500 ppm based on siloxane. $^1$H NMR and $^{29}$Si NMR showed that after 2 hours all SiOH groups had been converted into Si—O—SiMe$_2$-CH$_2$OH units (hydroxymethyl units). To remove the catalyst, the crude product was purified by thin film distillation (130° C., 10 mbar, 400 g/h). The catalyst passed over in the distillate, leaving behind pure α,ω-bis(hydroxymethyl)polydimethylsiloxane.

Example 5

Producing a Compound of General Formula I 1000 g of Me-siloxane (α,ω-bishydroxy-terminated polydimethylsiloxane having an Mn of 2930 g/mol, determined by $^1$H NMR spectroscopy; corresponds to 341.3 mmol of polydimethylsiloxane having 682.6 mmol of SiOH groups) were reacted at 20° C. with 60.2 g of a mixture consisting of 2,2,5,5-tetramethyl-2,5-disila-1,4-dioxacyclohexane (compound 1) to an extent of 95% and of oligomers of 2,2,5,5-tetramethyl-2,5-disila-1,4-dioxacyclohexane to an extent of 5% (corresponds in total to 683 mmol of [OCH$_2$(SiMe$_2$)] units) and 0.5 g of tetramethylguanidine (catalyst) (500 ppm based on Me-siloxane). The oligomer of 2,2,5,5-tetramethyl-2,5-disila-1,4-dioxacyclohexane consisted mainly of H—[O—CH$_2$—SiMe$_2$]$_n$—OH (n≥1; mainly n<<1; corresponds to a compound of structure 3 for n>1) and of H—[O—CH$_2$—SiMe$_2$]$_n$—O—[SiMe$_2$-CH$_2$—O]$_b$—H (corresponds to a compound of structure 3 with n=d, b=f, e=0; n≥1, b≥2; mainly n>>1 and b>>2). The compounds of structure 3 were formed by moisture acting on 2,2,5,5-tetramethyl-2,5-disila-1,4-dioxacyclohexane. $^1$H NMR and $^{29}$Si NMR showed that after 8 hours all SiOH groups had been converted to Si—O—SiMe$_2$-CH$_2$OH units (hydroxymethyl units). To remove the catalyst, the crude product was purified by thin film distillation (130° C., 10 mbar, 400 g/h). Pure α,ω-bis(hydroxymethyl)polydimethylsiloxane was left behind. This example shows that not only 2,2,5,5-tetramethyl-2,5-disila-1,4-dioxacyclohexane but also its oligomers are suitable for derivitization of SiOH groups.

Example 6

Producing a Compound of General Formula I

Example 1 is repeated except that 0.1 g (100 ppm) of sodium methoxide (catalyst) was used instead of tetramethylguanidine. The reaction mixture was stirred at 20-30° C. for 90 minutes, at which point the catalyst was neutralized by addition of stoichiometric amounts of acetic acid (formation of sodium acetate). The mixture was stirred at 20-30° C. for a further 60 minutes, the neutralization product methanol was removed under reduced pressure and precipitated sodium acetate was filtered off to obtain pure α,ω-bis(hydroxymethyl)-polydimethylsiloxane.

Example 7

Producing a Compound of General Formula I 1000 g of silicone oil (α,ω-bishydroxy-terminated polymethylvinylsiloxane having a vinyl:methyl ratio of 1:4 and an Mn of 2800 g/mol, determined by $^1$H NMR spectroscopy; corresponds to 357.1 mmol of polymethylvinylsiloxane with 714.3 mmol of SiOH groups) were reacted at 70-100° C. with 63.0 g (357.2 mmol) of 2,2,5,5-tetramethyl-2,5-disila-1,4-dioxacyclohexane (compound 1) and 100 mg of formic acid (catalyst). $^1$H NMR and $^{29}$Si NMR showed that after 3 hours all SiOH groups had been converted into Si—O—SiMe$_2$-CH$_2$OH units (hydroxymethyl units). Then, to deactivate the catalyst, 500 mg of triethylamine were added to the reaction solution, followed by brief distillation under reduced pressure (5 mbar) at 80° C., leaving behind pure α,ω-bis(hydroxymethyl)polymethylvinylsiloxane.

Example 8

Producing a Compound of the General Formula VIII 3.40 g of siloxane (α,ω-bishydroxy-terminated polydimethylsiloxane having an Mn of 1336 g/mol, determined by $^1$H NMR spectroscopy; corresponds to 2.545 mmol of siloxane with 5.09 mmol of SiOH groups) were admixed at 20° C. with 1.00 g (5.67 mmol) of 2,2,5,5-tetramethyl-2,5-disila-1,4-dioxacyclohexane (compound 1) and 170 mg of basic alumina (Brockmann activity I) (catalyst). The mixture was stirred at 120° C. for 2 hours. $^1$H NMR showed that after 2 hours all SiOH groups had been converted to Si—O—[(SiMe$_2$-CH$_2$—O)$_i$—H] units (average i equal to around 2).

Example 9

Producing a Compound of the General Formula I

A product produced as per example 8 was admixed with 4.17 g of siloxane (α,ω-bishydroxy-terminated polydimethylsiloxane having an Mn of 1336 g/mol, determined by $^1$H NMR spectroscopy; corresponds to 3.12 mmol of siloxane with 6.24 mmol of SiOH groups). The mixture was stirred at 120° C. for 2 hours. $^1$H NMR showed that after 2 hours all SiOH groups had reacted with Si—O—[(SiMe$_2$-CH$_2$—O)$_i$—H] units to form Si—O—SiMe$_2$-CH$_2$OH units (hydroxymethyl units). The alumina was centrifuged off after cooling down to 20° C., leaving pure α,ω-bis(hydroxymethyl)polydimethylsiloxane in the supernatant.

Example 10

Producing a Compound of the General Formula I

A product produced as per example 8 was admixed with 1.00 g of water (solvolysis reagent, hydrolysis) and 2 mL of 1,4-dioxane. The mixture was refluxed for 2 hours. $^1$H NMR showed that after 2 hours all Si—O—[(SiMe$_2$-CH$_2$—O)$_f$—H] units had been converted into Si—O—SiMe$_2$-CH$_2$OH units (hydroxymethyl units) (in accordance with the invention). The hydrolysis byproduced 1,3-bis(hydroxymethyl)-1,1,3,3-tetramethyldisiloxane (not in accordance with the invention). The alumina was centrifuged off after cooling to 20° C. The supernatant was freed of 1,3-bis(hydroxymethyl)-1,1,3,3-tetramethyldisiloxane in a kugelrohr evaporator (130° C., 0.1 mbar), leaving behind pure α,ω-bis(hydroxymethyl)polydimethylsiloxane.

Example 11

Producing Compounds of Structure 3

11 g of 2,2,5,5-tetramethyl-2,5-disila-1,4-dioxacyclohexane (compound 1) were admixed with a few drops of methanol and stored undercover at room temperature for 24 hours. NMR analysis showed that about 30% was unchanged, the remainder (about 70%) being converted into compounds of the HO—[O—CH$_2$—SiR$^2{}_2$]$_n$—OMe structure, which corresponds to structures of formula III with Z=H, Y=OCH$_3$, R$^2$=Me and n (mean value)=50, or structures 3 with d (mean value)=50, e=0, f=0 and R=Me.

Example 12

Producing a Compound of the General Formula I 201.2 g of Me-siloxane (α,ω-bishydroxy-terminated polydimethylsiloxane) having an Mn of 3557 g/mol, determined by $^1$H NMR spectroscopy; corresponds to 56.6 mmol of polydimethylsiloxane with 113 mmol of SiOH groups) were reacted at room temperature with 11.06 g (125 mmol of Me$_2$Si—CH$_2$O units) of a mixture of the compounds 2,2,5,5-tetramethyl-2,5-disila-1,4-dioxa-cyclohexane (compound 1, about 30% fraction) and of an oligomer of formula III Z—[O—CH$_2$—SiR$^2{}_2$]$_n$—Y with Z=H, Y=OCH$_3$, R$^2$=Me and n (mean value)=50 (about 70% fraction; corresponds to a compound of structure 3) (product of example 11) in the presence of 0.39 g (3.39 mmol, corresponds to about 1800 ppm) of tetramethylguanidine (catalyst). $^1$H NMR and $^{29}$Si NMR showed that after 24 hours all SiOH groups had been converted into Si—O—SiMe$_2$-CH$_2$OH units (hydroxymethyl units). To remove the catalyst, the crude product was heated to 100° C. at 0.03 Torr for 2 hours. The residue consisted of α,ω-bis(hydroxymethyl)polydimethylsiloxane.

Example 13

Producing a Compound of the General Formula I 201.2 g of Me-siloxane (α,ω-bishydroxy-terminated polydimethylsiloxane) having an Mn of 3557 g/mol, determined by $^1$H NMR spectroscopy; corresponds to 56.6 mmol of polydimethylsiloxane with 113 mmol of SiOH groups) were reacted at 50° C. with 11.06 g (125 mmol of Me$_2$Si—CH$_2$O units) of a mixture of the compounds 2,2,5,5-tetramethyl-2,5-disila-1,4-dioxacyclohexane (compound 1, about 30% fraction) and of an oligomer of formula III Z—[O—CH$_2$—SiR$^2{}_2$]$_n$—Y with Z=H, Y=OCH$_3$, R$^2$=Me and n (mean value)=50 (about 70% fraction; corresponds to a compound of structure 3) in the presence of 0.106 g (0.92 mmol, corresponds to about 500 ppm) of tetramethylguanidine (catalyst). $^1$H NMR and $^{29}$Si NMR showed that after 60 minutes 94% of all SiOH groups had been converted into Si—O—SiMe$_2$-CH$_2$OH units (hydroxymethyl units).

Example 14

Producing Compounds of Structure 4

1.41 g (8.0 mmol) of 2,2,5,5-tetramethyl-2,5-disila-1,4-dioxacyclohexane (compound 1) and 50 mg of phosphoronitrile chloride (catalyst) were stirred at 20° C. for 18 hours. Thereafter, in addition to compound 1 (proportion in mixture: 90%, GC), the compounds of structures 4p, 4q, 4r and 4s were detectable by GC and GC/MS (MS [m/z]: 4p, 264; 4q, 352; 4r, 440; 4s, 528; in each case [M$^+$]).

Example 15

Producing Compounds of Structure 4

1.76 g (10.0 mmol) of 2,2,5,5-tetramethyl-2,5-disila-1,4-dioxacyclohexane (compound 1) and 60 mg of phosphoronitrile chloride (catalyst) were stirred at 100° C. for 7 hours. Thereafter, in addition to compound 1 (proportion in mixture: 71%, GC), the compounds of structures 4p and 4q were detectable by GC and GC/MS (MS [m/z]: 4p, 264; 4q, 352; in each case [M$^+$]).

Example 16

Producing Compounds of Structure 4

3.50 g (20.0 mmol) of 2,2,5,5-tetramethyl-2,5-disila-1,4-dioxacyclohexane (compound 1) and 180 mg of Tonsil® (catalyst) were stirred at 100° C. for 4 hours. Thereafter, in addition to compound 1 (proportion in mixture: 63%, GC), the compounds of structures 4p, 4q, 4r and 4s were detectable by GC and GC/MS (MS [m/z]: 4p, 264; 4q, 352; 4r, 440; 4s, 528; in each case [M$^+$]).

Example 17

Producing Compounds of Structure 4

3.50 g (19.8 mmol) of 2,2,5,5-tetramethyl-2,5-disila-1,4-dioxacyclohexane (compound 1), 3.00 g (10.1 mmol) of octamethylcyclotetrasiloxane and 60 mg of phosphoronitrile chloride (catalyst) were stirred at 20° C. for 2 hours. The solution became viscous. The mixture was left to stand at 20° C. for a further 18 hours without disruption. Thereafter, in addition to compound 1 (proportion in mixture: 11%, GC), the compounds of structures 4a-4u were detectable by GC and GC/MS, predominantly the compounds 4a-e.

Example 18

Producing Compounds of Structure 4

3.50 g (19.8 mmol) of 2,2,5,5-tetramethyl-2,5-disila-1,4-dioxacyclohexane (compound 1), 7.40 g (20.0 mmol) of decamethylcyclopentasiloxane and 0.12 g of phosphoronitrile chloride (catalyst) were stirred at 20° C. for 25 hours. The solution became viscous. The mixture was left to stand at 20° C. for a further 18 hours without disruption. Thereafter, in addition to compound 1 (proportion in mixture: 24%, GC), the compounds of structures 4a-4u were detectable by GC and GC/MS, predominantly the compounds 4a-e.

Example 19

Producing Compounds of Structure 3

7.06 g (40.0 mmol) of 2,2,5,5-tetramethyl-2,5-disila-1,4-dioxacyclohexane (compound 1) and 36.0 mg (2.00 mmol) of water (corresponds to ROH as solvolysis reagent with R=H) were dissolved in 5 mL of tetrahydrofuran (THF) and stirred at 20° C. for 2 days. Thereafter, in addition to compound 1, the compounds HOCH$_2$SiMe$_2$OH, HOCH$_2$SiMe$_2$OSiMe$_2$CH$_2$OH and compounds of structure 3 with R=H, e=0, d≥1 and f≥2 were detectable by GC and GC/MS. A repeat with addition of 0.07 g of tributylamine (catalyst) led to an identical result.

Example 20

Producing Compounds of Structure 3

0.948 g (5.38 mmol) of 2,2,5,5-tetramethyl-2,5-disila-1,4-dioxacyclohexane (compound 1) was mixed with 0.172 g (5.38 mmol) of methanol and kept at room temperature undercover for 7 days. Conversion took place to the compound HOCH$_2$Si(OMe)Me$_2$ and also to compounds of structure 3 (=oligomers with R=Me, e=0, f=0, d≥2, especially d=2-10); their NMR-spectroscopically determined fraction amounted altogether to about 89%; in addition, 11% of unconverted 2,2,5,5-tetramethyl-2,5-disila-1,4-dioxacyclohexane (compound 1) was detected.

Example 21

Producing Compounds of Structure 3

0.948 g (5.38 mmol) of 2,2,5,5-tetramethyl-2,5-disila-1,4-dioxacyclohexane (compound 1) was mixed with 0.344 g (10.6 mmol) of methanol and kept at room temperature undercover for 24 hours. Conversion took place to the compound HOCH$_2$Si(OMe)Me$_2$ and also to compounds of structure 3 (=oligomers with R=Me, e=0, f=0, d≥2, especially d=2-10); their NMR-spectroscopically determined fraction amounted altogether to about 91%; in addition, 9% of unconverted 2,2,5,5-tetramethyl-2,5-disila-1,4-dioxacyclohexane (compound 1) is detected.

Example 22

Producing Compounds of Structure 3

11.02 g of the product mixture from example 18 were stirred with 0.64 g of methanol (corresponds to ROH as solvolysis reagent with R=Me) at 20° C. for 7 days. Thereafter, GC and GC/MS, in addition to compound 1 (18%, GC), detected compounds of structure 4 (45%, GC) and HOCH$_2$Si(OMe)Me$_2$ compounds of structure 3 with R=Me, e≥0, d≥1 and f=0, mainly representatives with e=1 or 2 and d=1 or 2.

Example 23

Producing Compounds of Structure 4

3.50 g (19.8 mmol) of 2,2,5,5-tetramethyl-2,5-disila-1,4-dioxacyclohexane (compound 1), 4.45 g (20.0 mmol) of hexamethylcyclotrisiloxane and 0.12 g of phosphoronitrile chloride were stirred at 20° C. for 1 hour. The solution became viscous. Thereafter, GC and GC/MS, in addition to compound 1 (proportion of mixture: 7% GC), detected the compounds of structures 4a-4s (GC: 4a 38%, 4b 11%, 4c 1%, 4d 2.5%, 4e 14%, 4k 1%, 4u 4%; the remainder consisted of other compounds of structure 4).

The invention claimed is:
1. A method for producing (hydroxymethyl)polysiloxanes of the general formula I

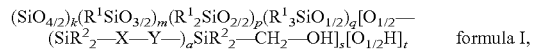   formula I, which comprises reacting silanol-containing organosiloxanes of the general formula II

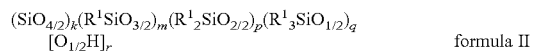   formula II with cyclic or acyclic compounds which include at least one unit of the general formula III

   formula III where

R$^1$ denotes a hydrogen atom or a cyclic or acyclic, linear or branched, aromatic or aliphatic or olefinic, saturated or unsaturated C$_1$-C$_{20}$ hydrocarbon, C$_1$-C$_{20}$ hydrocarbonoxy or C$_4$-C$_{40}$ polyether moiety optionally substituted with Q$^1$ and optionally interrupted by one or more heteroatom-containing groups Q$^2$, R$^2$ denotes a cyclic or acyclic, linear or branched aromatic or aliphatic or olefinic, saturated or unsaturated C$_1$-C$_{20}$ hydrocarbon, C$_1$-C$_{20}$ hydrocarbonoxy, C$_4$-C$_{40}$ polyether or Si$_1$-Si$_{20}$ siloxanyl moiety optionally substituted with Q$^1$, optionally interrupted by one or more heteroatom-containing groups Q$^2$ or containing one or more heteroatom-containing groups Q$^2$, Q$^1$ denotes a heteroatom-containing monovalent moiety, Q$^2$ denotes a heteroatom-containing divalent moiety or a heteroatom-containing trivalent moiety, Z represents hydrogen, a group X—SiR$^2{}_2$—, or combines with Y to represent a bonding electron pair, X represents a group R$^2$, a siloxane group or a bonding electron pair to Y or may be bonded to Y or X combines with Y to denote an oxygen atom or denotes an oxygen atom attached to Y, Y represents the meanings of R$^2$ or Q$^1$ or Q$^2$ or represents a siloxane moiety or a hydrolysable group inclusive hydroxyl or combines with Z to represent a bonding electron pair and may be attached to Z via X and may be interrupted by one or more optionally substituted siloxane groups or combines with X to denote an oxygen atom, with the proviso that Y in the case of n=1 denotes a hydrolysable group or a siloxane moiety which contains at least one hydrolysable group or combines with X to denote an oxygen atom or is attached to X or combines with Z to represent a bond, s represents values of at least 1, r represents values of at least 1, t represents values of at least 0, n represents values of at least 1, the sum s+t represents the value of r, k, m, p, q denote values not less than zero, with the proviso that the sum k+m+p+q denotes a sum of at least 2, a represents the value 0 or 1.

2. The method for producing (hydroxymethyl)polysiloxanes as claimed in claim 1, wherein the silanol-containing organosiloxanes/organosiloxane resins used of formula II are compounds conforming to the following formula IIa:

$$H[OSiR^{11}_2]_\alpha OH \qquad \text{formula IIa,}$$

where α denotes whole-numbered values of 2 to 20 000 and $R^{11}$ denotes methyl, ethyl, vinyl, allyl or phenyl.

3. The method for producing (hydroxymethyl)polysiloxanes as claimed in claim 1, wherein the formula III compounds used are compounds conforming to the following formula IIIa:

$$Z-[O-CH_2-SiR^{12}_2]_n-Y \qquad \text{formula IIIa,}$$

where $R^{12}$ is methyl, ethyl, vinyl, allyl, phenyl, methoxy, ethoxy, n-propoxy, isopropoxy, n-butoxy, isobutoxy, sec-butoxy, tert-butoxy, n-pentoxy, tert-pentoxy or n-hexoxy, and n, Y and Z represent the same meanings as defined above.

4. The method for producing (hydroxymethyl)polysiloxanes as claimed in claim 1, wherein the formula I product produced are the following compounds of formula Ia:

$$HOCH_2SiR^{12}_2[OSiR^{11}_2]_\alpha OSiR^{12}_2CH_2OH \qquad \text{formula Ia,}$$

where α denotes whole-numbered values of 2 to 20 000 and $R^{11}$ and $R^{12}$ have the above-defined meanings, by reacting compounds of formula IIa with compounds of formula IIIa.

5. The method for producing (hydroxymethyl)polysiloxanes as claimed in claim 1, wherein at least one of the formula III compounds used is selected from compounds of the following general formulae IV, V, VI, VII or VIII:

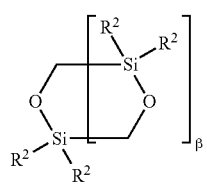

formula IV

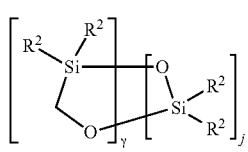

formula V

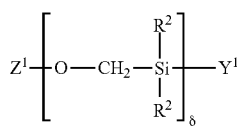

formula VI

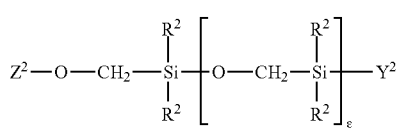

formula VII $$(SiO_{4/2})_k \quad (R^1SiO_{3/2})_m \quad (R^1_2SiO_{2/2})_p \quad (R^1_3SiO_{1/2})_q$$

formula VIII

-continued $$[O_{1/2}-(SiR^2_2-X-Y-)_a(SiR^2_2-CH_2-O)_iZ^3]_u$$

$$[O_{1/2}-(SiR^2_2-X-Y-)_a(SiR^2_2-CH_2-OZ^3]_v[O_{1/2}Z^4]_w,$$

where $R^1$ in the formula VIII represents the same meanings as defined above, $R^2$ in the formulae IV-VIII represents the same meanings as defined above, β, γ, δ, ε represent the same meanings as n as defined above, i is a whole-numbered value not less than 2, j in formula V denotes a whole-numbered value not less than 0, k, m, p and q and their above-defined sum in formula VIII represent the same values as defined above, u in formula VIII represents a value not less than 1, v in formula VIII represents a value not less than 0, w in formula VIII represents a value not less than 0, $Y^1$ in formula VI represents a moiety $R^2$, a moiety —O—$(SiR^2_2-CH_2-O)_bZ^1$, a hydrogen atom or a hydrolysable group, with the proviso that $Y^1$ when δ in formula VI represents the meaning 1 represents a hydrolysable group inclusive alkoxy, aryloxy, or hydroxyl, or a hydrogen atom, or represents a moiety —O—$(SiR^2_2-CH_2-O)_bH$ with b not less than 2, b represents values not less than 1, $Y^2$ in formula VII represents a moiety $R^2$, a moiety —O—$(SiR^2_2-CH_2-O)_cZ^2$, a hydrogen atom or a hydrolysable group inclusive hydroxyl, c represents values not less than 1, $Z^1$ represents a hydrogen atom, a silyl group attached via a silicon atom or a siloxanyl group attached via a silicon atom, $Z^2$ represents a hydrogen atom, a silyl group attached via a silicon atom, a siloxanyl group attached via a silicon atom, or—when ε in formula VII represents a value not less than 2 or $Y^2$ is a hydrolysable group—represents an alkyl, aryl or acyl group optionally substituted with $Q^1$ or interrupted by one or more groups $Q^2$, $Z^3$ represents a hydrogen atom, a silyl group attached via a silicon atom, a siloxanyl group attached via a silicon atom, or—when i in formula VIII represents a value not less than 3—represents an alkyl, aryl or acyl group optionally substituted with $Q^1$ or interrupted by one or more groups $Q^2$, $Z^4$ represents the same meanings as $Z^1$, a represents the same meanings as defined above.

6. The method as claimed in claim 1, wherein at least one of the formula III compounds used is selected from the compounds conforming to the following formula IIIb:

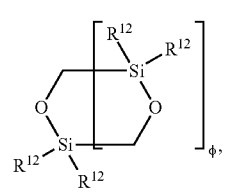

formula IIIb where $R^{12}$ represents the same meanings as defined above and where φ represents whole-numbered values not less than 1.

7. The method as claimed in claim 1, wherein at least one silylating agent is added and the resultant silylated intermediate is converted into compounds of formula I by solvolysis with protic compounds.

8. The method as claimed in claim 1, wherein at least one of the compounds involved is reacted with a silylating agent having the structure $R^1_3Si$-AG, where the AG group represents a hydrolysable leaving group.

9. The method as claimed in claim 1, wherein an excess of compounds of formula III is used and wherein resultant intermediate compounds of formula VIII are wholly or partly converted into compounds of formula I by solvolysis with protic compounds or by thermolysis, wherein excess means that the amount of substance of total structural units $[OCH_2SiR^2_2]$ present in the formula III compounds used represents a value greater than the amount of substance of total structural units $[O_{1/2}H]$ present in the formula I compounds used.

* * * * *